(12) United States Patent
Muraki (10) Patent No.: US 8,381,265 B2
(45) Date of Patent: Feb. 19, 2013

(54) MEMBER REGISTRATION METHOD, COMMUNITY SERVICE SYSTEM, PORTABLE TERMINAL, AND MEMBER INVITATION PROCESSING PROGRAM

(75) Inventor: Kazunori Muraki, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 12/642,961

(22) Filed: Dec. 21, 2009

(65) Prior Publication Data

US 2010/0162412 A1 Jun. 24, 2010

(30) Foreign Application Priority Data

Dec. 22, 2008 (JP) ................. P2008-325324

(51) Int. Cl.
*H04L 29/06* (2006.01)
(52) U.S. Cl. ............................. 726/3; 713/168
(58) Field of Classification Search .............. 726/28, 726/3; 705/319; 713/150, 168
See application file for complete search history.

(56) References Cited

U.S. PATENT DOCUMENTS

| | | | |
|---|---|---|---|
| 7,390,952 B2 * | 6/2008 | Hasegawa | 84/600 |
| 8,112,501 B2 * | 2/2012 | Sampson et al. | 709/219 |
| 2004/0133440 A1 * | 7/2004 | Carolan et al. | 705/1 |
| 2005/0216300 A1 * | 9/2005 | Appelman et al. | 705/1 |
| 2006/0064436 A1 | 3/2006 | Fowler et al. | |
| 2008/0134052 A1 * | 6/2008 | Davis et al. | 715/744 |
| 2008/0270038 A1 | 10/2008 | Partovi et al. | |

FOREIGN PATENT DOCUMENTS

| | | |
|---|---|---|
| JP | 2006330798 A | 12/2006 |
| RU | 2335801 C2 | 3/2006 |
| WO | 2005074441 A | 8/2005 |
| WO | 2008051676 A | 5/2008 |

OTHER PUBLICATIONS

Russian Decision on Grant for RU2009146971/08(066942) issued May 23, 2011.
Korean Office Action for KR10-2009-0125913 Issued Jul. 29. 2011.
Russian Office Action for RU2009146971/08(066942) issued Dec. 28, 2010.
Chinese Patent Office office action in counterpart Chinese patent application 200910260654.7, dated Apr. 28, 2012.

* cited by examiner

Primary Examiner — Ali Abyaneh (57) ABSTRACT

A community member registration method is for registering a member in a community service system in which a community service server, and authentication server and a plurality of portable terminals are connected via a network. The community service server provides community service, the authentication server determines whether or not a member has authority to receive services provided by the community service server, and the portable terminals are capable of direct communication to each other. The method includes: sending a terminal identifier obtained from a portable terminal of an invitee together with a registration request from a portable terminal of an inviter to the authentication server; issuing an account of the invitee in response to the registration request in the authentication server; notifying the account to the portable terminal of the inviter from the authentication server; and sending the account from the portable terminal of the inviter to the portable terminal of the invitee.

10 Claims, 10 Drawing Sheets

| TERMINAL IDENTIFIER | ACCOUNT | AUTHENTICATION AUTHORITY |
|---|---|---|
| mop000123 | ame0001 | ○ |
| mop357226 | heb0584 | ○ |
| mop365791 | ywv0154 | × |
| mop224512 | plq0026 | × |
| ⋮ | ⋮ | ⋮ |

FIG. 10

| TERMINAL IDENTIFIER | ACCOUNT | AUTHENTICATION AUTHORITY (NUMBER OF INVITATIONS PERMITTED) |
|---|---|---|
| mop000123 | ame0001 | 5 |
| mop357226 | heb0584 | 2 |
| mop365791 | ywv0154 | 0 |
| mop224512 | plq0026 | 1 |
| ⋮ | ⋮ | ⋮ |

MEMBER REGISTRATION METHOD, COMMUNITY SERVICE SYSTEM, PORTABLE TERMINAL, AND MEMBER INVITATION PROCESSING PROGRAM

This application is based upon and claims the benefit from Japanese patent application No. 2008-325324, filed on Dec. 22, 2008, the disclosure of which is incorporated herein in its entirety by reference.

BACKGROUND OF THE INVENTION

1. Field of the Invention

The present invention relates to a system for registering members in a member service provided on a network. In particular, it relates to a system which enables real time registration.

2. Description of Related Art

In recent years, it has become popular to set up websites for members, which are called "communities" or the like, on networks such as the Internet. A "community" in the present specification is not limited to a specific type of service website such as a SNS (Social Network Service), a blog or the like, it represents all service websites for members. There is a variety of such communities; some allow people who have not registered to use some of their functions, and some restrict all of their functions to members.

Many communities use an invitation system, and only the people who have established the communities or people who have received an invitation from a member can register a member.

Figure 11:
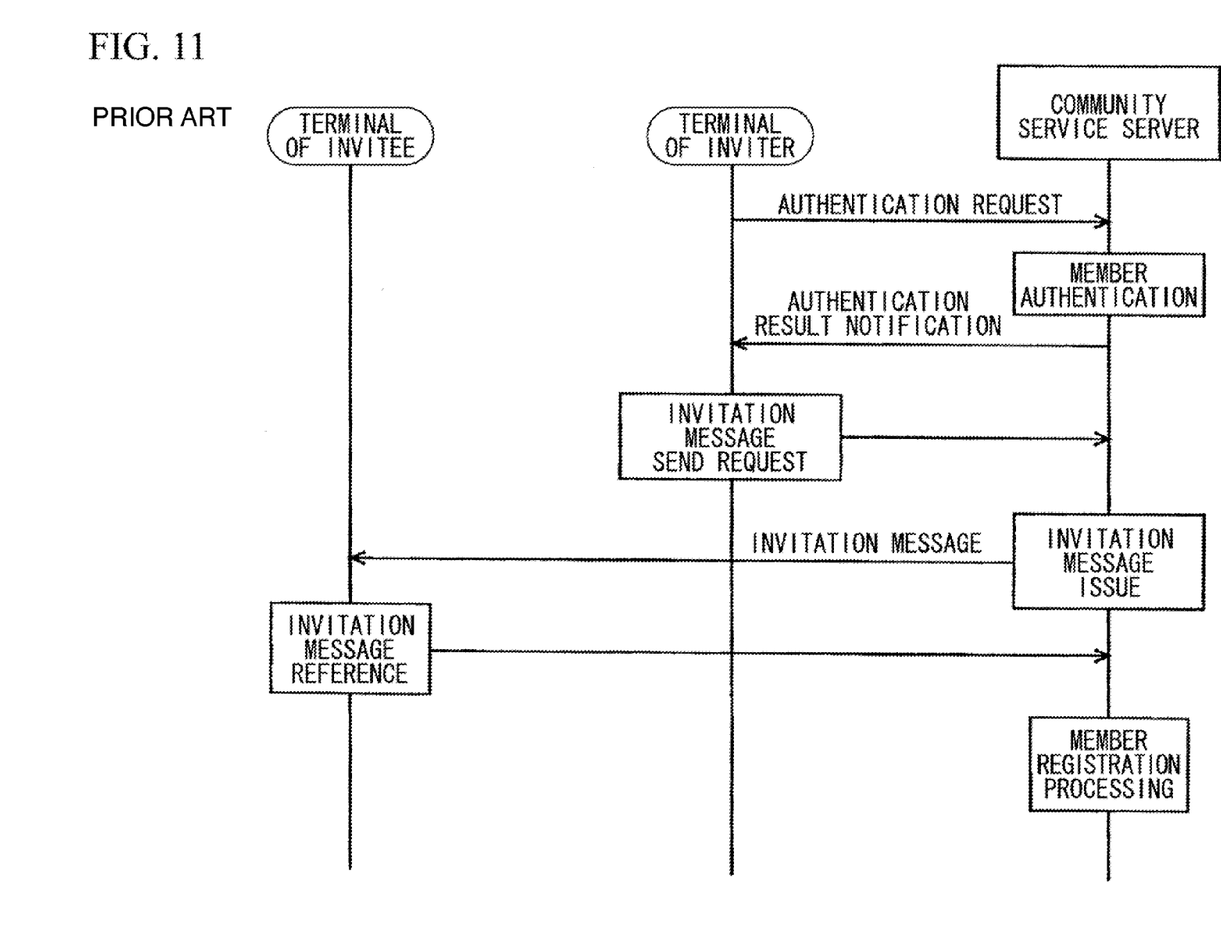
FIG. 11 is a diagram showing an example of an operation at the time of member registration in a community service system related to the present invention.

FIG. 11 shows an example of a member registration sequence for such a community.

An inviter logs in to the community and performs an operation to send an invitation message to the electronic mail address of an invitee using an invitation function provided in the community site. When this operation is performed, the invitation message is transmitted to the electronic mail address of the invitee from the community service server. The invitee refers to the invitation message, accesses a member registration URL described therein, and goes through the member registration procedure. After the member registration procedure is completed, the invitee can use the community freely as a member who has completed registration.

A technique associated with member registration in a community using such a procedure is disclosed in Japanese Unexamined Patent Application, First Publication No. 2006-330798 (referred to hereunder as Patent Document 1).

In the member registration sequence, the inviter sends an invitation message to the electronic mail address of the invitee using a function of the community website. Therefore, the invitee needs to give his/her electronic mail address to the inviter using some method.

However, there is a case in which an invitee has psychological resistance to giving his/her electronic mail address to someone else, which can be a cause of hesitation in joining the community.

If the invitee uses a free mail service, such psychological resistance is reduced. However, in the case where a free mail service is used, there are the following problems.

The abovementioned member registration sequence also includes a process in which the invitee accesses a member registration URL with reference to the electronic mail invitation massage. Some free mail services cannot be used from a portable terminal, and even some of those that can be used from a portable terminal require the registration procedure to be done in advance, so they cannot be used in the case where there has been no existing registration. Therefore, in the case where an invitation message is sent to a free mail service address, if the invitee is not in an environment where he/she can operate his/her computer terminal, there is a possibility that registration in the community cannot be completed immediately.

Furthermore, a party to whom an invitation message is sent is normally an acquaintance. Therefore, it is not unusual that at the point of time that the inviter sends the invitation message to the invitee, the parties have already agreed with each other on the invitee's joining the community. In such a case, in spite of the mutual agreement between the inviter and the invitee, similar operations (operation of sending an invitation message, operation of accessing the member registration URL) must be performed on the network, which doubles the effort.

In the method disclosed in Patent Document 1 as described above, there are problems that registration in a community cannot be completed immediately, and redundant operations are forced on an inviter and invitee.

SUMMARY OF THE INVENTION

An exemplary object of the invention is to provide a community member registration method, a community service system, a portable terminal and, a member invitation processing program capable of performing member registration processing without needing the electronic mail address of an invitee to be given to an inviter, without forcing redundant operations on the inviter and invitee, and with no delay.

A community member registration method according to a first exemplary aspect of the invention is for registering a member in a community service system in which a community service server, and authentication server and a plurality of portable terminals are connected via a network. The community service server provides community service, the authentication server determines whether or not a member has authority to receive services provided by the community service server, and the portable terminals are capable of direct communication to each other. The method includes: sending a terminal identifier obtained from a portable terminal of an invitee together with a registration request from a portable terminal of an inviter to the authentication server; issuing an account of the invitee in response to the registration request in the authentication server; notifying the account to the portable terminal of the inviter from the authentication server; and sending the account from the portable terminal of the inviter to the portable terminal of the invitee.

A community service system according to a second exemplary aspect of the invention includes: a community service server that provides community service; an authentication server that determines whether or not a member has authority to receive services provided by the community service server; a plurality of portable terminals that include a first portable terminal and a second portable terminal; and a network that connects between the community service server, the authentication server, and the plurality of portable terminals, and the first portable terminal includes: a terminal-to-terminal communication section that communicates directly with the second portable terminal; an invitation processing section that obtains a terminal identifier of the second portable terminal through the terminal-to-terminal communication section; a network communication section that sends the terminal identifier of the second portable terminal and one of a terminal identifier of the first portable terminal and an account of a user of the first portable terminal, together with a registration request to the authentication server via the network, the invitation processing section sending to the second portable terminal an account of the second portable terminal notified from the authentication server, and the authentication server includes: an authentication section that confirms whether the user of the first portable terminal which is a sender of the registration request is the member or not, based on the one of the terminal identifier of the first portable terminal and the account of the user of the first portable terminal; a registration section that issues the account of the second portable terminal in response to the registration request from the first portable terminal confirmed to be a portable terminal of the member, and associates the account of the second portable terminal, with the terminal identifier of the second portable terminal received with the registration request and registers the account of the second portable terminal and the terminal identifier of the second portable terminal; and a communication section that notifies the account of the second portable terminal associated with the terminal identifier of the second portable terminal to the first portable terminal which is the sender of the registration request.

A portable terminal according to a third exemplary aspect of the invention is connected via a network to a community service server that provides community service, and an authentication server that determines whether or not a member has authority to receive services provided by the community service server. The portable terminal includes: a terminal-to-terminal communication section that communicates directly with an other portable terminal; an invitation processing section that obtains a terminal identifier of the other portable terminal through the terminal-to-terminal communication section; and a network communication section that sends the terminal identifier of the other portable terminal and one of a terminal identifier of the portable terminal and an account of a user of the portable terminal, together with a registration request to the authentication server via the network, the invitation processing section sending to the other portable terminal an account of the other portable terminal notified from the authentication server through the terminal-to-terminal communication section.

A community member invitation program according to a fourth exemplary aspect of the invention is for making a portable terminal execute a process of inviting a community member, the portable terminal including the terminal-to-terminal communication section which directly communicating with an other portable terminal, and the portable terminal connected via a network to a community service server that provides the community service and to an authentication server that determines whether or not a member has authority to receive services provided by the community service server. The program making a computer that controls the portable terminal execute: obtaining a terminal identifier of the other portable terminal by communicating directly with the other portable terminal; and sending the terminal identifier of the other portable terminal and one of a terminal identifier of the portable terminal and an account of a user of the portable terminal, together with a registration request to the authentication server via the network through the terminal-to-terminal communication section; and sending an account of the other portable terminal notified from the authentication server to the other portable terminal.

EXEMPLARY EMBODIMENT

First Exemplary Embodiment

A first exemplary embodiment of a suitable implementation of the present invention will be described.

Figure 1:
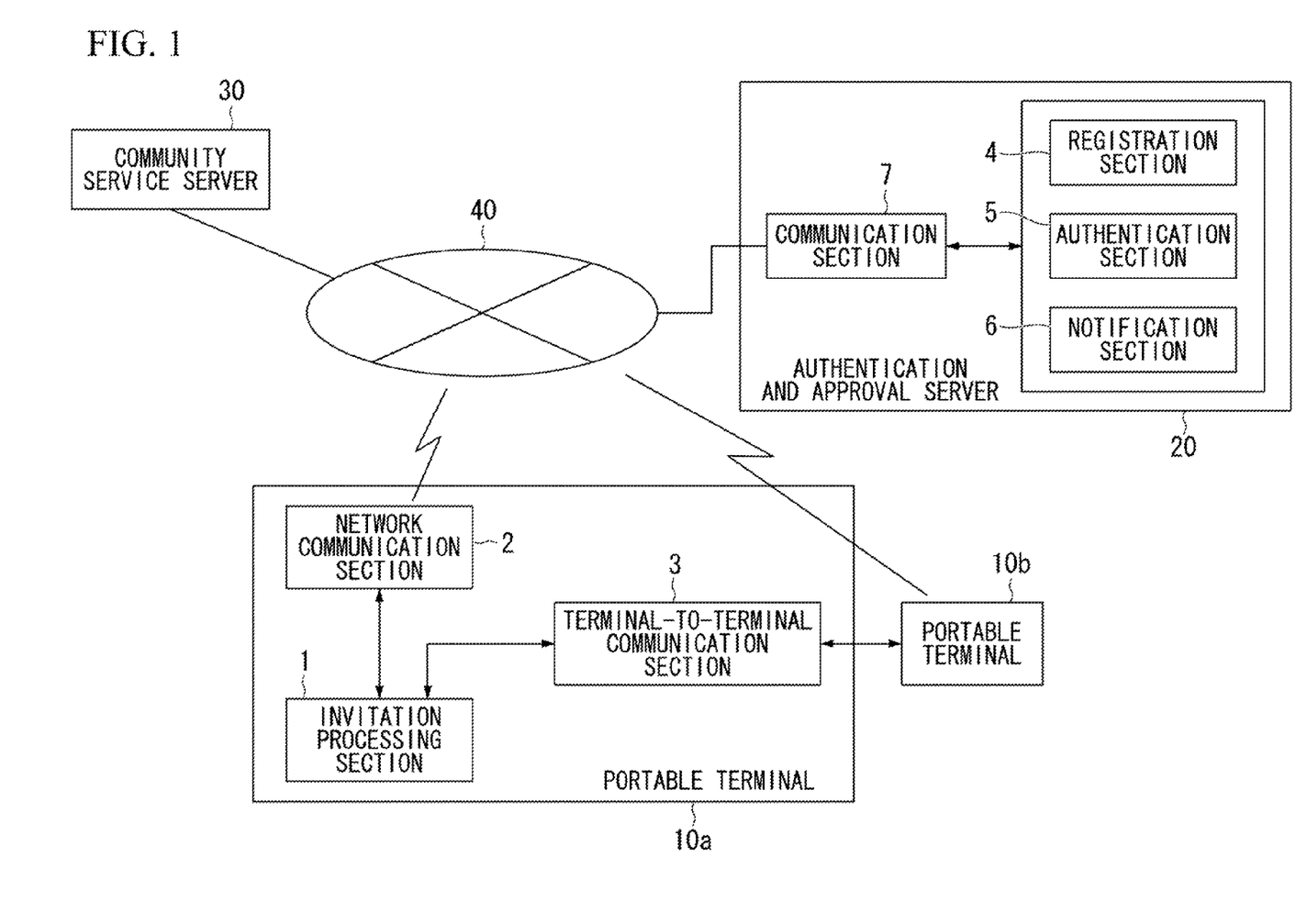
FIG. 1 is a diagram showing the structure of a community service system according to a first exemplary embodiment of the present invention.

FIG. 1 shows the structure of a community service system. This system includes portable terminals 10a and 10b, an authentication and approval server (authentication server) 20, a community service server (application server) 30, connected via a network 40. The portable terminal 10a and the portable terminal 10b have identical structures. In the case where it is not necessary to distinguish between the portable terminal 10a and the portable terminal 10b, they are referred to as portable terminal 10. Portable terminal 10 is referred to as portable terminal 10a or portable terminal 10b only in the case where it is necessary to distinguish between the portable terminal 10a and the portable terminal 10b.

The portable terminal 10 includes a terminal-to-terminal communication section 3, a network communication section 2, and an invitation processing section 1. The terminal-to-terminal communication section 3 communicates directly between terminals. The network communication section 2 communicates with other portable terminals, the community service server 30, the authentication and approval server 20, and the like, via the network 40. The invitation processing section 1 obtains the terminal identifier of an other portable terminal via the terminal-to-terminal communication section 3, requests the registration of the terminal identifier of the own terminal (i.e. portable terminal 10) or a user's account and the terminal identifier of the other portable terminal as well as sending them from the network communication section 2 to the authentication and approval server 20 via the network 40. Then, the invitation processing section 1 sends the account notified by the authentication and approval server 20 to the other portable terminal via the terminal-to-terminal communication section 3.

The authentication and approval server 20 includes an authentication section 5, a registration section 4, and a notification section 6. The authentication section 5 confirms whether the user of the portable terminal of the sender of a registration request is a member or not based on the terminal identifier of the portable terminal 10 or the user's account. The registration section 4 issues an account according to the registration request from the portable terminal of the member, associates the account with the terminal identifier of the other portable terminal received with the registration request, and registers the account and the terminal identifier associated with each other. The notification section 6 notifies the account associated with the terminal identifier of the other portable terminal to the portable terminal of the sender of the registration request.

Figure 2:
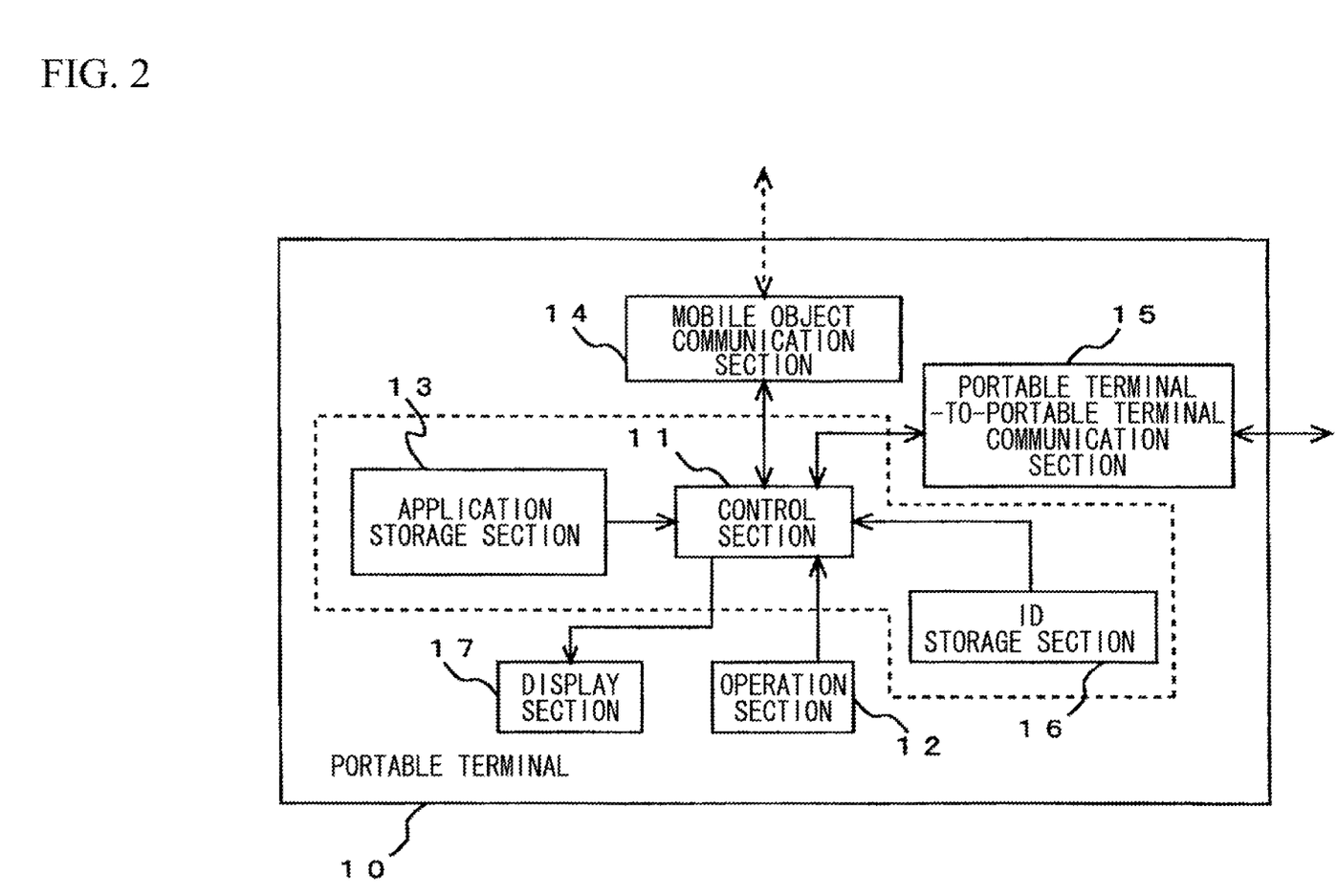
FIG. 2 is a diagram showing the structure of a portable terminal according to the first exemplary embodiment of the present invention.

FIG. 2 shows the structure of the portable terminal 10. The portable terminal 10 includes a control section 11, an operation section 12, an application storage section 13, a mobile object communication section 14, a portable terminal-to-portable terminal communication section 15, an ID storage section 16, and a display section 17. The control section 11 has a CPU, a RAM and the like, and controls the operation of the portable terminal 10. The operation section 12 is an input interface for receiving operations from a user. The application storage section 13 stores an application program that the control section 11 can execute. The mobile object communication section 14 is a communication interface for sending and receiving information via the network through the mobile object communication network. The portable terminal-to-portable terminal communication section 15 is a communication interface for sending and receiving information directly between itself and other portable terminals. The communication mode of the portable terminal-to-portable terminal communication section 15 may be non-contact communication in which infrared communication, non-contact IC, Bluetooth, or the like is used, or may be communication by cable via a communication cable. An identifier that specifies the own terminal uniquely is stored in the ID storage section 16. The display section 17 is a user interface for notifying information to the user. As the display section 17, a device for visual information display, such as a liquid crystal display or the like may be employed, and a speaker may also be employed.

The control section 11, the application storage section 13, and the ID storage section 16 correspond to the invitation processing section 1 shown in FIG. 1. The mobile object communication section 14 corresponds to the network communication section 2 shown in FIG. 1. The portable terminal-to-portable terminal communication section 15 corresponds to the terminal-to-terminal communication section 3 shown in FIG. 1.

Figure 3:
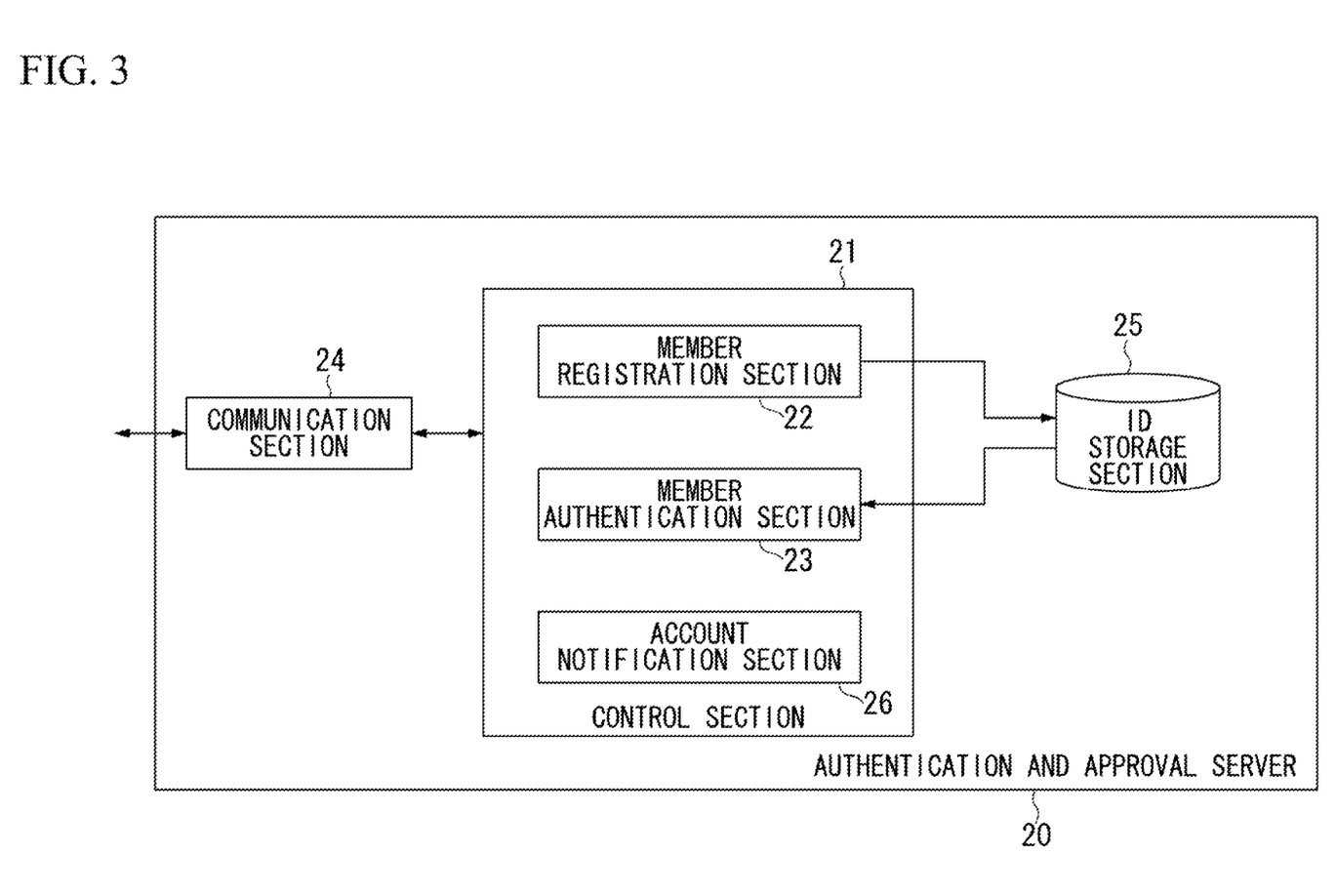
FIG. 3 is a diagram showing the structure of an authentication and approval server according to the first exemplary embodiment of the present invention.

FIG. 3 shows the structure of the authentication and approval server 20. The authentication and approval server 20 includes a control section 21, a communication section 24, and an ID storage section 25. The control section 21 controls the operation of the authentication and approval server 20. The control section 21 includes a member registration section 22, a member authentication section 23, and an account notification section 26. On receiving a member registration request from the portable terminal 10, the member registration section 22 associates the identifier to be registered for a new member with an account, and stores them in the ID storage section 25. On receiving the registration request from the portable terminal 10, the member authentication section 23 determines whether or not the portable terminal that has requested registration belongs to a registered member based on the terminal identifier and the account stored in the ID storage section 25. Furthermore, on receiving the authentication request from the community service server 30, the member authentication section 23 determines whether or not the portable terminal that accessed the community service server 30 belongs to the registered member based on the terminal identifier and the account stored in the ID storage section 25. The communication section 24 is an interface for sending and receiving information via the network 40. The ID storage section 25 associates the member's account and the terminal identifier of the portable terminal of the member, and stores them. The account notification section 26 notifies the account allocated to the invitee to the portable terminal of the sender of the member registration request.

The member registration section 22 corresponds to the registration section 4 shown in FIG. 1, the member authentication section 23 corresponds to the authentication section 5 shown in FIG. 1, the account notification section 26 corresponds to the notification section 6 shown in FIG. 1, and the communication section 24 corresponds to the communication section 7 shown in FIG. 1.

Figure 4:
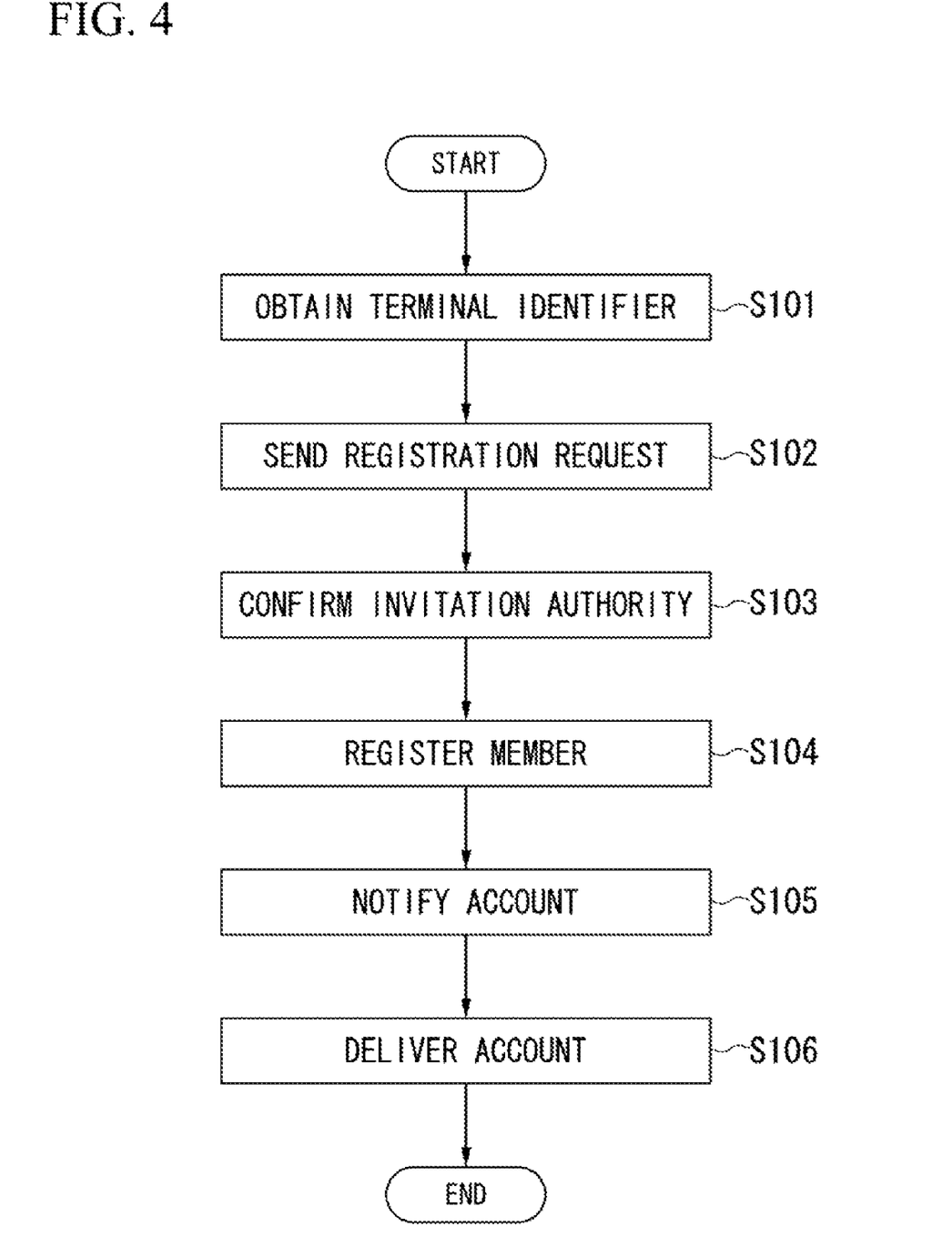
FIG. 4 is a diagram showing the flow of a member registration operation of the community service system according to the first exemplary embodiment of the present invention.
Figure 5:
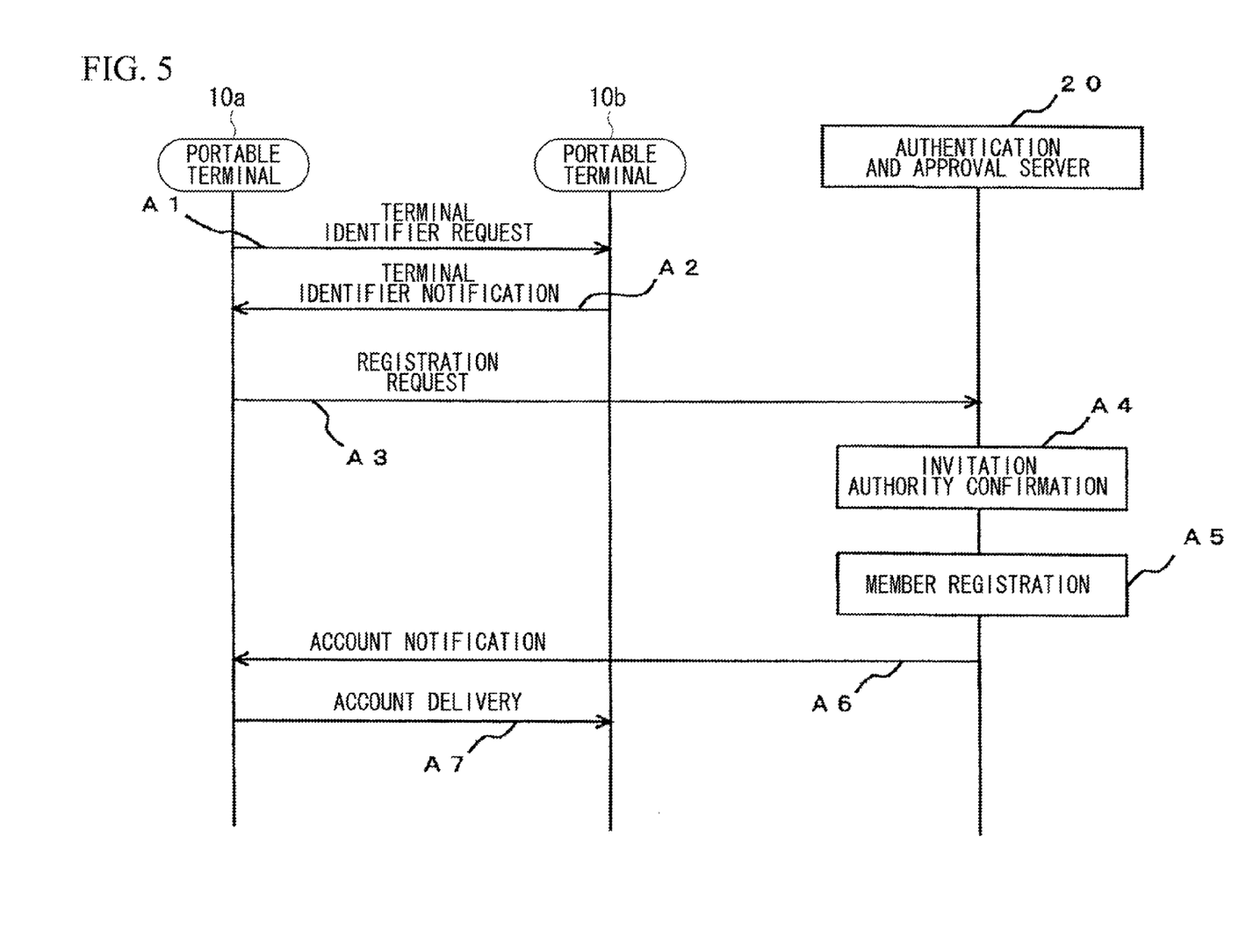
FIG. 5 is a diagram showing an example of an operation sequence of member registration in the community service system according to the first exemplary embodiment of the present invention.

FIG. 4 shows the flow of a member registration operation in the community service system. Furthermore, FIG. 5 shows an example of a sequence of the member registration operation in the community service system. It is assumed that the portable terminal 10a is a terminal belonging to a person (inviter) having authority to invite another user, and the identifier of the terminal is stored in the ID storage section 25 of the authentication and approval server 20. Moreover, an application (invitation application) for inviting another user is stored in an application storage section 13a of the portable terminal 10a.

When the operation to start the invitation application stored in the application storage section 13a is performed in the portable terminal 10a via an operation section 12a, a control section 11a reads the invitation application from the application storage section 13a, and executes it. The invitation application executed in the control section 11a requests the portable terminal 10b to send the terminal identifier via a portable terminal-to-portable terminal communication section 15a (FIG. 5, A1).

On receiving the request to send the terminal identifier via the portable terminal-to-portable terminal communication section 15b, a control section 11b reads the terminal identifier (referred to here as ID: b) stored in an ID storage section 16b, and sends it to the portable terminal 10a via the portable terminal-to-portable terminal communication section 15b (FIG. 5, A2). Sequences A1 and A2 of FIG. 5 correspond to the processing of step S101 of FIG. 4.

The above-described processing may be changed as follows. On receiving the request to send the terminal identifier, the control section 11b instructs a display section 17b to display a message to enquire whether or not it is possible to send the terminal identifier. The terminal identifier is sent to the portable terminal 10a via the portable terminal-to-portable terminal communication section 15b only in the case where an operation to permit the sending of the terminal identifier is performed via the operation section 12b.

When the terminal identifier is received from the portable terminal 10b, the invitation application executed in the control section 11a reads the terminal identifier (referred to here as ID: a) stored in an ID storage section 16a. Next, the terminal identifier (ID: a) of the own terminal (i.e., the portable terminal 10a) and the terminal identifier (ID: b) obtained from the portable terminal 10b, which is the portable terminal of the person who intends to perform new member registration, are sent to the authentication and approval server 20 with the registration request via the mobile object communication section 14a (FIG. 5, A3). The sequence A3 of FIG. 5 corresponds to the processing of step S102 of FIG. 4.

The above-described processing may be changed as follows. The control section 11a instructs the display section 17a to display a message to request an account to be input instead of reading the terminal identifier "a" from the ID storage section 16a. Next, the account input via the operation section 12a is sent to the authentication and approval server 20 with the registration request via the mobile object communication section 14a.

On receiving the registration request from the portable terminal 10a via the communication section 24, the control section 21 of the authentication and approval server 20 confirms whether or not the terminal identifier of the portable terminal of the sender is stored in the ID storage section 25 using the member authentication section 23 (FIG. 5, A4). Here, since the terminal identifier (ID: a) is stored in the ID storage section 25, the control section 21 determines that the registration request is from the registered member. The sequence A4 of FIG. 5 corresponds to the processing of step S103 of FIG. 4.

Afterwards, the member registration section 22 allocates an unused account to the terminal identifier (ID: b) whose registration is requested from the portable terminal 10a, associates them, and stores them in the ID storage section 25 (FIG. 5, A5). The sequence A5 of FIG. 5 corresponds to the processing of step S104 of FIG. 4.

Afterwards, the account notification section 26 sends the terminal identifier (ID: b) as well as the account allocated thereto to the portable terminal 10a via the communication section 24 (FIG. 5, A6). The sequence A6 of FIG. 5 corresponds to the processing of step S105 of FIG. 4.

The portable terminal 10a receives the terminal identifier and the account from the authentication and approval server 20. Then, the invitation application executed in the control section 11a of the portable terminal 10a communicates with the portable terminal 10b using the portable terminal-to-portable terminal communication section 15a, and confirms that the terminal identifier of the portable terminal 10b matches the terminal identifier received from the authentication and approval server 20. After the confirmation, the invitation application sends the account received from the authentication and approval server 20 to the portable terminal 10b via the portable terminal-to-portable terminal communication section 15a (FIG. 5, A7). The sequence A7 of FIG. 5 corresponds to the processing of step S106 of FIG. 4.

By the portable terminal 10b obtaining the account from the portable terminal 10a via the portable terminal-to-portable terminal communication section 15b, the member registration processing is completed. The control section 11b instructs the display section 17b to display a message to advise of the completion of the member registration in the community service system and the account allocated. In this manner, the user of the portable terminal 10b acknowledges the completion of the member registration and the account allocated to them.

By the completion of the member registration, the user of the portable terminal 10b can use services provided by the community service server 30 from the desired information processing terminal using the account advised from the authentication and approval server 20.

Figure 6:
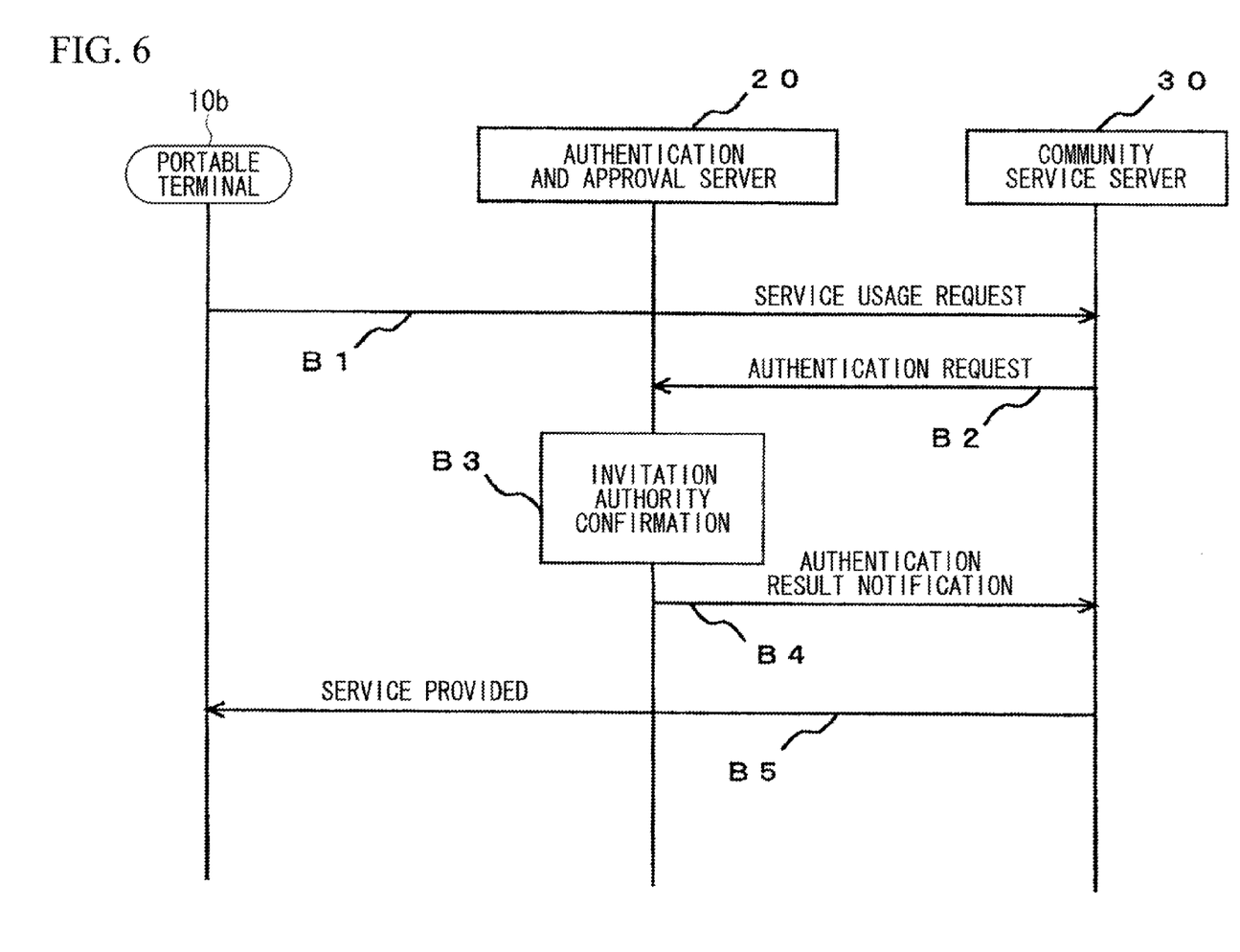
FIG. 6 is a diagram showing an example of an operation sequence in the case where a user of the portable terminal uses a service provided by the community server in the first exemplary embodiment of the present invention.

FIG. 6 shows an example of an operation sequence in the case where a user of the portable terminal 10b uses a service provided by the community service server 30.

When the operation for requesting use of the service provided by the community service server 30, and the account, are input via the operation section 12b, the control section 11b sends the service usage request and the account to the community service server 30 using a mobile object communication section 14b (FIG. 6, B1).

On receiving the service usage request, the community service server 30 sends the account received together with the service usage request to the authentication and approval server 20, and requests authentication of the account (FIG. 6, B2).

The authentication and approval server 20 responds to the request from the community service server 30, and the member authentication section 23 confirms that the requested account is stored in the ID storage section 25 (FIG. 6, B3). The control section 21 sends the authentication result to the community service server 30 using the communication section 24 (FIG. 6, B4).

On receiving the authentication result from the authentication and approval server 20, the community service server 30 provides the service to the portable terminal 10b (FIG. 6, B5).

A case is used here as an example in which member authentication is received using an account. Alternatively, the above-described processing may be changed as follows. The terminal identifier of the portable terminal 10b is stored in the ID storage section 25 associated with the account allocated. Therefore, in the case where the portable terminal 10b is used, it is also possible to receive member authentication using the terminal identifier instead of the account name.

As described above, in the community service system according to the first exemplary embodiment, in a situation in which communication is possible between portable terminals, a person who has invitation authority can invite an invitee to that community, on the spot.

Furthermore, since the member registration processing is performed by the application processing of the portable terminals, there is no need for the invitee to give their mail address to the inviter. As a result, psychological resistance to joining the community can be reduced, thus promoting participation in the community, which invigorates the community.

Second Exemplary Embodiment

A second exemplary embodiment of a suitable implementation of the present invention will be described. Similarly to the first exemplary embodiment, a community service system according to the second exemplary embodiment includes portable terminals 10a and 10b, an authentication and approval server 20, and a community service server 30, connected via a network 40. The construction of each portable terminal 10 and the authentication and approval server 20 are identical to that of the first exemplary embodiment.

Figure 7:
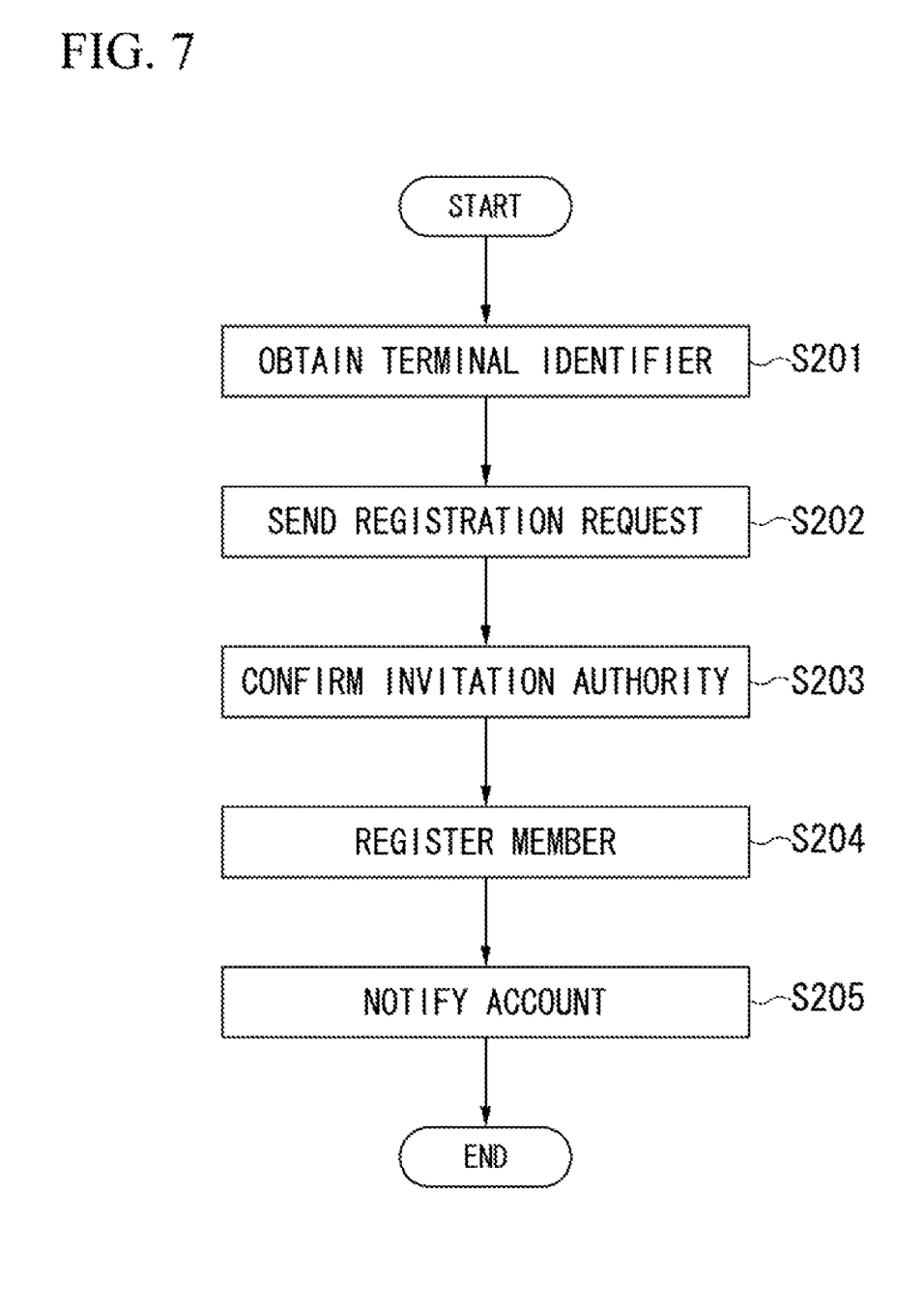
FIG. 7 is a diagram showing the flow of a member registration operation in a community service system according to a second exemplary embodiment of the present invention.

FIG. 7 shows the flow of a member registration operation in the community service system according to the second exemplary embodiment. The flow of the member registration operation is almost the same as that in the first exemplary embodiment. However, in the second exemplary embodiment, the account notification section 26 sends the account allocated to the invitee to the portable terminal of the invitee.

That is, since the account is directly notified to the portable terminal of the invitee, the operation corresponding to step S106 is not performed.

Figure 8:
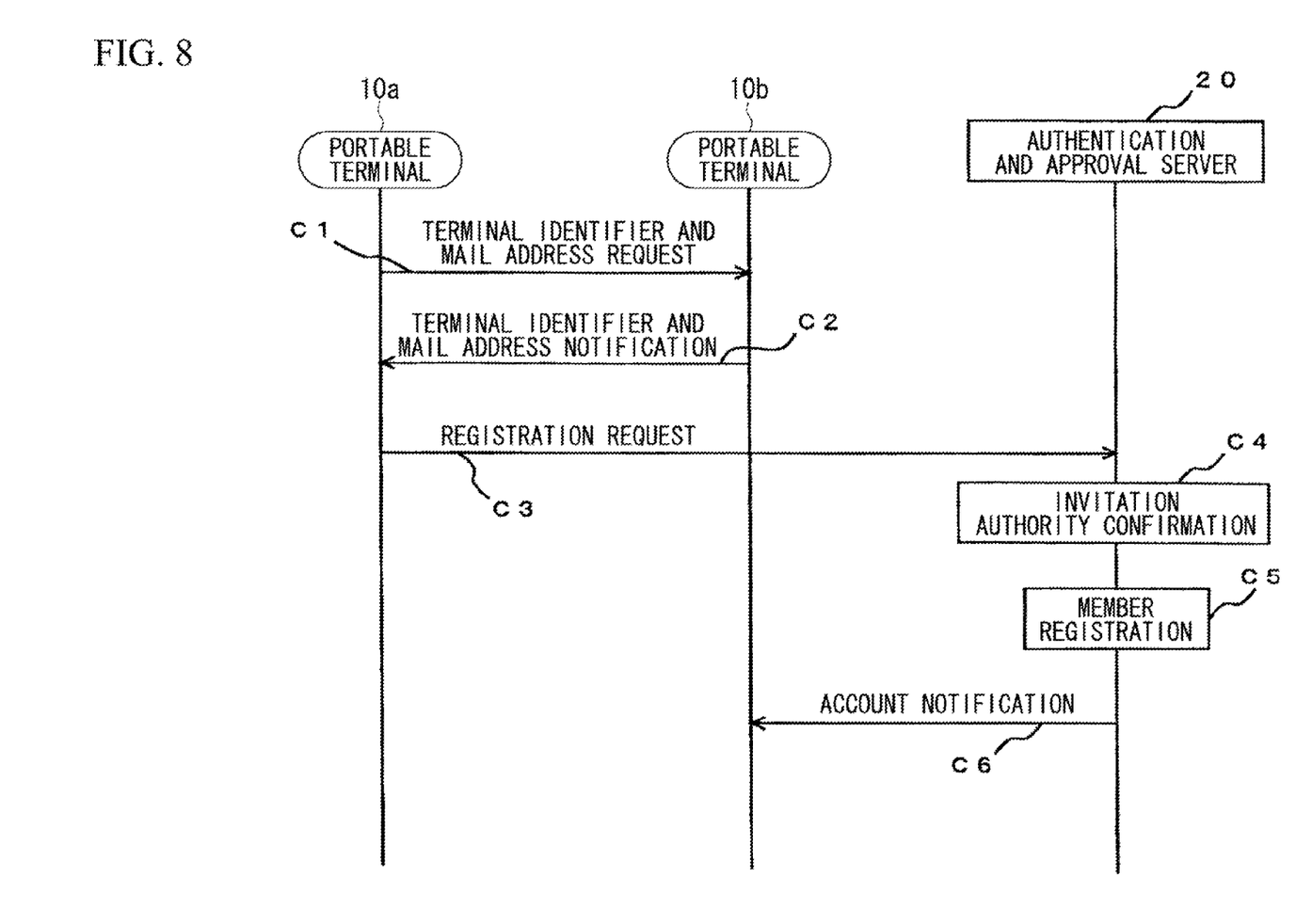
FIG. 8 is a diagram showing an example of an operation sequence of member registration in the community service system according to the second exemplary embodiment of the present invention.

FIG. 8 shows an example of an operation sequence of member registration in the community service system according to the second exemplary embodiment.

When the operation to start the invitation application stored in the application storage section 13a is performed in the portable terminal 10a via the operation section 12a, the control section 11a reads the invitation application from the application storage section 13a, and executes it. The invitation application executed in the control section 11a requests the portable terminal 10b to send the terminal identifier and the mail address via the portable terminal-to-portable terminal communication section 15a (FIG. 8, C1).

The control section 11b receives the request to send the terminal identifier and the mail address via the portable terminal-to-portable terminal communication section 15b. Then, the control section 11b reads the terminal identifier (referred to here as ID: b) stored in the ID storage section 16b, and sends it to the portable terminal 10a via the portable terminal-to-portable terminal communication section 15 with the mail address of the own terminal (i.e., the portable terminal 10b) (FIG. 8, C2). Sequences C1 and C2 of FIG. 8 correspond to the processing of step S201 of FIG. 7. At this time, the arrangement may also be such that the control section 11b instructs the display section 17b to display a message to enquire whether or not it is possible to send the terminal identifier and the mail address, and the terminal identifier and the mail address are sent to the portable terminal 10a via the portable terminal-to-portable terminal communication section 15b only in the case where an operation to permit the sending of the terminal identifier is performed via the operation section 12b.

When the portable terminal 10a receives the terminal identifier and the mail address from the portable terminal 10b, the invitation application executed in the control section 11a reads the terminal identifier (referred to here as ID: a) stored in an ID storage section 16a. Next, the terminal identifier (ID: a) of the own terminal (i.e., the portable terminal 10a), the terminal identifier (ID: b) obtained from the portable terminal 10b, which is the portable terminal of the person who intends to perform new member registration, and the mail-address of the portable terminal 10b are sent to the authentication and approval server 20 with the registration request via the mobile object communication section 14a (FIG. 8, C3). The sequence C3 of FIG. 8 corresponds to the processing of step S202 of FIG. 7.

In the above-described processing, the control section 11a reads the terminal identifier "a" from the ID storage section 16a, and sends the terminal identifier "a". Alternatively, it is also possible to arrange such that the control section 11a instructs the display section 17a to display a message to request account input, and sends the account received via the operation section 12a with the registration request to the authentication and approval server 20 via the mobile object communication section 14a.

The control section 21 of the authentication and approval server 20 receives the registration request from the portable terminal 10a via the communication section 24. Then, the control section 21 confirms whether or not the terminal identifier of the portable terminal of the sender is stored in the ID storage section 25 using the member authentication section 23 (FIG. 8, C4). Here, since the terminal identifier (ID: a) is stored in the ID storage section 25, the control section 21 determines that the registration request is from the registered member. The sequence C4 of FIG. 8 corresponds to the processing of step S203 of FIG. 7.

Afterwards, the member registration section 22 allocates an unused account to the terminal identifier (ID: b) whose registration is requested from the portable terminal 10a, associates them, and stores them in the ID storage section 25 (FIG. 8, C5). The sequence C5 of FIG. 8 corresponds to the processing of step S204 of FIG. 7.

Afterwards, the account notification section 26 sends the account allocated to the terminal identifier (ID: b) to the mail address of the portable terminal 10b via the communication section 24 (FIG. 8, C6). The sequence C6 of FIG. 8 corresponds to the processing of step S205 of FIG. 7.

The member registration processing is completed by the portable terminal 10b receiving the mail in which the account is described in the text. The control section 11b instructs the display section 17b to display a message to advise of the completion of the member registration in the community service system and the account allocated. In this manner, the user of the portable terminal 10b acknowledges the completion of the member registration and the account allocated to them.

The procedure of using the community service from the portable terminal 10b after the completion of member registration is similar to the first exemplary embodiment, and hence duplicate description is omitted.

In this manner, in the community service system according to the second exemplary embodiment, since the account allocated to the invitee is notified directly to the portable terminal of the invitee, the invitee does not need to receive the account from the inviter. Therefore, both the inviter and the invitee can reduce their labor in the member registration processing.

Moreover, it is only required that the mail address of the invitee is obtained from the portable terminal of the invitee by the application by the portable terminal of the inviter, and the inviter themself does not need to know it. As a result, psychological resistance to joining the community can be reduced, thus promoting participation in the community, which invigorates the community.

Third Exemplary Embodiment

A third exemplary embodiment of a suitable implementation of the present invention will be described. Similarly to the first exemplary embodiment, a community service system according to the third exemplary embodiment includes portable terminals 10a and 10b, an authentication and approval server 20, and a community service server 30, connected via a network 40. The construction of each portable terminal 10 and the authentication and approval server 20 are identical to that of the first exemplary embodiment.

In the third exemplary embodiment, there are members who have invitation authority and members who do not have invitation authority, and information indicating whether there is authority or not is associated with the account and the terminal identifier. At the time of the processing corresponding to step S103, it is determined whether or not there is invitation authority, not from the fact of whether the terminal identifier or the account of the portable terminal of the sender of the registration request is stored in the ID storage section 25, but based on the information indicating whether or not there is invitation authority that is associated with the terminal identifier or the account.

Figure 9:
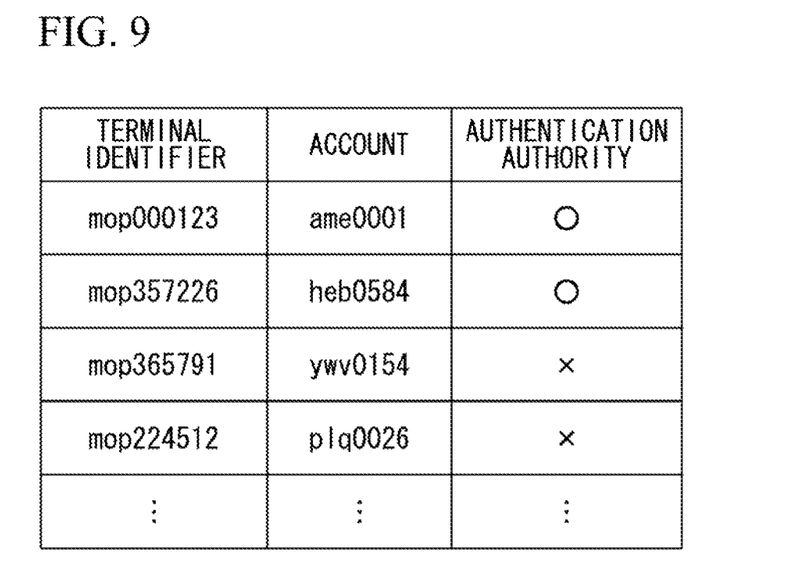
FIG. 9 is a diagram showing an example of information stored in an ID storage section in which accounts and terminal identifiers are associated, in a third exemplary embodiment of the present invention.

FIG. 9 shows an example of the information stored in the ID storage section 25 in which accounts and terminal identifiers are associated.

For a method to give invitation authority to a member, any arbitrary method is applicable. For example, the arrangement may be such that the establisher of the community bestows invitation authority using a function of the community. For another example, the arrangement may be such that it can be selected whether or not invitation authority is bestowed on an invitee when the person is invited. Furthermore, the arrangement may be such that invitation authority is bestowed on those who are invited directly by the establisher of the community, and that invitation authority is not bestowed on those who are invited by other members.

In the third exemplary embodiment, when allocating an account to the terminal identifier whose registration is requested from the portable terminal of a user having invitation authority, the member registration section 22 stores the information indicating whether or not there is invitation authority in the ID storage section 25. In this manner, membership of the community is limited to those who are invited by invitation authority holders. Therefore it is possible to prevent any unidentified person from being registered as a member.

Figure 10:
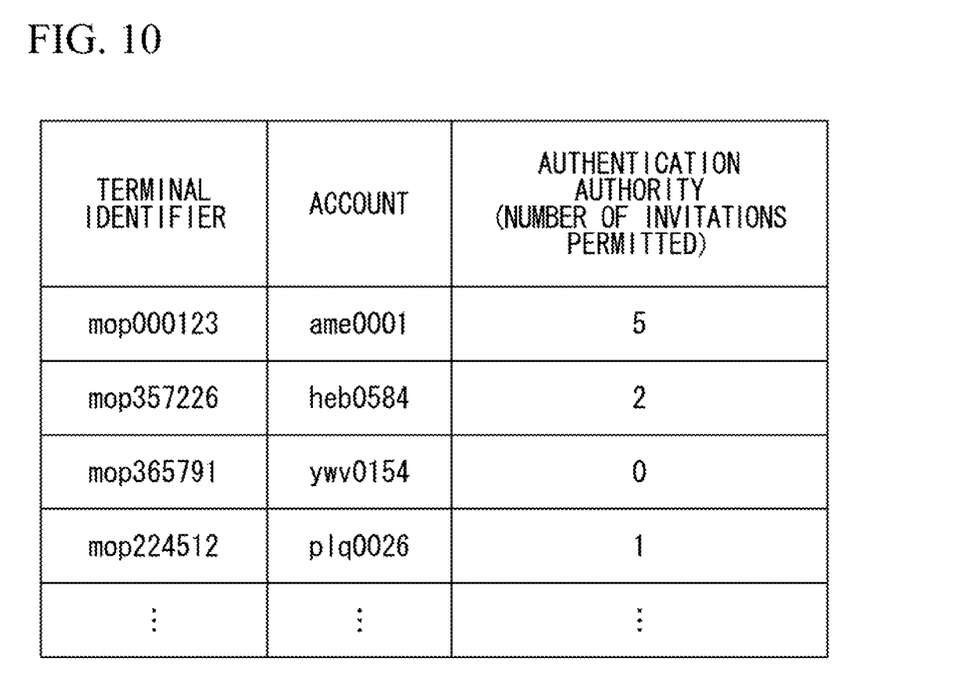
FIG. 10 is a diagram showing an example of information stored in the ID storage section in the case where the number of people who may be invited is set as an authorized invitation limit, in the third exemplary embodiment of the present invention.

Moreover, as shown in FIG. 10, it is also possible to set the number of people who may be invited by each invitation authority. In this manner, it is possible to prevent acquaintances of a specific member from occupying a majority of the membership, and the community from being dominated.

Other than the existence of invitation authority, the sequence of member registration, for example, is similar to the first exemplary embodiment, and hence duplicate description is omitted. It is also possible to make the operations similar to the second exemplary embodiment.

The above-described exemplary embodiments are suitable examples for implementing the present invention, but the present invention is not limited to these.

For example, in the exemplary embodiments, a construction in which there are two portable terminals is shown as an example. However, there may also be three or more portable terminals.

In this manner, a range of modification is possible in the present invention.

A program may cause the portable terminal 10 shown in FIG. 1 to execute a process of inviting a community member.

A program for implementing the functions of the portable terminal 10 illustrated in FIG. 1 may be recorded in a computer-readable recording medium. The program recorded on the recording medium may be read into a computer system and the portable terminal 10 may execute a process of inviting a community member.

The computer system used herein includes hardware, such as an OS and peripheral devices.

The computer system may also include a homepage providing environment (or a display environment) so long as such an environment utilizes a WWW system.

Examples of the computer-readable recording medium include a portable medium, such as a flexible disc, a magneto-optical disc, a ROM and a CD-ROM and a storage device, such as hard disk incorporated in the computer system. Examples of the computer-readable recording medium include a medium which dynamically holds a program for a short time. Such a medium includes a communication line for transmitting a program via a communication line, such as a network, like the Internet, and a telephone line. Examples of the computer-readable recording medium may also include a medium which holds the program for a certain period of time to implement the communication described above. Such a medium may include a volatile memory incorporated in the computer system used as a server or a client. The above-described program may implement only part of the above-described functions. The above-described functions may be implemented in combination with programs previously recorded in the computer system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A community member registration method for registering a member in a community service system in which a community service server, and authentication server and a plurality of portable terminals are connected via a network, wherein the community service server provides community service, the authentication server determines whether or not a member has authority to receive services provided by the community service server, and the portable terminals are capable of direct communication to each other, the method comprising:

obtaining, by a portable terminal of an inviter, a terminal identifier of a portable terminal of an invitee by direct communication between the portable terminals of the inviter and the invitee;

sending the terminal identifier obtained from the portable terminal of the invitee together with a registration request from the portable terminal of the inviter to the authentication server;

issuing an account of the invitee in response to the registration request in the authentication server;

notifying the account to the portable terminal of the inviter from the authentication server; and sending the account from the portable terminal of the inviter to the portable terminal of the invitee, wherein obtaining the terminal identifier of the portable terminal of the invite comprises:

sending from the portable terminal of the inviter to the portable terminal of the invitee a request to send the terminal identifier of the portable terminal of the invitee by direct communication between the portable terminals of the inviter and the invitee;

instructing the portable terminal of the invitee to display a message to inquire whether or not to send the terminal identifier of the portable terminal of the invitee in a case where the portable terminal of the invitee receives the request to send the terminal identifier of the portable terminal of the invitee; and sending from the portable terminal of the invitee to the portable terminal of the inviter the terminal identifier of the portable terminal of the invitee only in a case where an operation to permit sending of the terminal identifier of the portable terminal of the invitee is performed at the portable terminal of the invitee.

2. The community member registration method according to claim 1, wherein in sending the terminal identifier to the authentication server, the terminal identifier of the portable terminal of the invitee and one of a terminal identifier of the portable terminal of the inviter and an account of the inviter, together with the registration request, are sent from the portable terminal of the inviter to the authentication server via the network, the community member registration method further comprising:
- determining whether or not the inviter is the member, based on the one of the terminal identifier of the portable terminal of the inviter and the account of the inviter in the authentication server; and
- associating the account of the invitee issued in response to the registration request from the portable terminal of the inviter confirmed to be a portable terminal of the member, with the terminal identifier of the portable terminal of the invitee received with the registration request, and registering the account of the invitee and the terminal identifier of the portable terminal of the invitee in the authentication server,
- wherein in notifying the account, the authentication server notifies the account of the invitee associated with the terminal identifier of the portable terminal of the invitee to the portable terminal of the inviter, and
- wherein in sending the account to the portable terminal of the invitee, the portable terminal of the inviter sends the account of the invitee notified from the authentication server to the portable terminal of the invitee by direct communication between the portable terminals of the inviter and the invitee.

3. The community member registration method according to claim 2, further comprising:
- registering authentication authority information indicating whether or not the inviter has authority to invite the invitee to the community service in the authentication server together with a terminal identifier of the portable terminal of the inviter and an account of the inviter, and
- determining in the authentication server whether or not to issue the account of the invitee, associate the account of the invitee with the terminal identifier of the portable terminal of the invitee received with the registration request and register them, based on the authentication authority information.

4. The community member registration method according claim 3, wherein the portable terminal of the inviter sends together with the registration request, grant information indicating whether or not to grant the invitation authority to the invitee to the authentication server, and information of the authentication authority is registered in the authentication server based on the grant information.

5. A community member registration method for registering a member in a community service system in which a community service server, an authentication server and a plurality of portable terminals are connected via a network, wherein the community service server provides community service, an authentication server determines whether or not a member has authority to receive services provided by the community service server, and the portable terminals are capable of direct communication to each other, the method comprising:
- obtaining, by a portable terminal of an inviter, a terminal identifier of a portable terminal of an invitee and a mail address of the portable terminal of the invitee by direct communication between the portable terminals of the inviter and the invitee;
- sending the terminal identifier obtained from the portable terminal of the invitee together with a registration request from the portable terminal of the inviter to the authentication server;
- issuing an account of the invitee in response to the registration request in the authentication server; and
- notifying the account to the portable terminal of the invitee from the authentication server, wherein obtaining the terminal identifier and the mail address of the portable terminal of the invitee comprises:
- sending from the portable terminal of the inviter to the portable terminal of the invitee a request to send the terminal identifier and the mail address of the portable terminal of the invitee by direct communication between the portable terminals of the inviter and the invitee;
- instructing the portable terminal of the invitee to display a message to inquire whether or not to send the terminal identifier and the mail address of the portable terminal of the invitee in a case where the portable terminal of the invitee receives the request to send the terminal identifier and the mail address of the portable terminal of the invitee; and
- sending from the portable terminal of the invitee to the portable terminal of the inviter the terminal identifier and the mail address of the portable terminal of the invitee only in a case where an operation to permit sending of the terminal identifier and the mail address of the portable terminal of the invitee is performed at the portable terminal of the invitee.

6. The community member registration method according to claim 5,
- wherein in sending the terminal identifier to the authentication server, the terminal identifier of the portable terminal of the invitee and the mail address of the portable terminal of the invitee, and one of a terminal identifier of the portable terminal of the inviter and an account of the inviter, together with the registration request, are sent to the authentication server from the portable terminal of the inviter via the network,
the community member registration method further comprising:
- determining whether or not the inviter is the member, based on the one of the terminal identifier of the portable terminal of the inviter and the account of the inviter in the authentication server; and
- associating the account of the invitee issued in response to the registration request from the portable terminal of the inviter confirmed to be a portable terminal of the member, with the terminal identifier of the portable terminal of the invitee received with the registration request and registering the account of the invitee and the terminal identifier of the portable terminal of the invitee in the authentication server,
- wherein in notifying the account, the authentication server sends electronic mail including the account of the invitee associated with the terminal identifier of the portable terminal of the invitee to the mail address of the portable terminal of the invitee.

7. The community member registration method according to claim 6, further comprising:
- registering authentication authority information indicating whether or not the inviter has authority to invite the invitee to the community service in the authentication server together with a terminal identifier of the portable terminal of the inviter and an account of the inviter, and
- determining in the authentication server whether or not to issue the account of the invitee, associate the account of the invitee with the terminal identifier of the portable terminal of the invitee received with the registration request and register them, based on the authentication authority information.

8. The community member registration method according claim 7, wherein the portable terminal of the inviter sends together with the registration request, grant information indicating whether or not to grant the invitation authority to the invitee to the authentication server, and information of the authentication authority is registered in the authentication server based on the grant information.

9. A community service system comprising:
a community service server that provides community service;
an authentication server that determines whether or not a member has authority to receive services provided by the community service server;
a plurality of portable terminals that include a first portable terminal and a second portable terminal; and
a network that connects between the community service server, the authentication server, and the plurality of portable terminals,
the first portable terminal comprising:
a terminal-to-terminal communication section that communicates directly with the second portable terminal;
an invitation processing section that sends to the second portable terminal a request to send a terminal identifier of the second portable terminal through the terminal-to-terminal communication section, the invitation processing section obtaining the terminal identifier of the second portable terminal through the terminal-to-terminal communication section;
a network communication section that sends the terminal identifier of the second portable terminal and one of a terminal identifier of the first portable terminal and an account of a user of the first portable terminal, together with a registration request to the authentication server via the network,
the second portable terminal comprising:
a terminal-to-terminal communication section that communicates directly with the first portable terminal;
an invitation processing section that instructs a display section to display a message to inquire whether or not to send the terminal identifier of the second portable terminal in a case of receiving the request to send the terminal identifier of the second portable terminal; and
an operation section that receives an operation to permit sending of the terminal identifier of the second portable terminal,
the invitation processing section of the second portable terminal sending to the first portable terminal the terminal identifier of the second portable terminal through the terminal-to-terminal communication section of the second portable terminal only in a case where the operation section receives the operation to permit sending of the terminal identifier of the second portable terminal,
the invitation processing section of the first portable terminal sending to the second portable terminal an account of the second portable terminal notified from the authentication server,
the authentication server comprising:
an authentication section that confirms whether the user of the first portable terminal which is a sender of the registration request is the member or not, based on the one of the terminal identifier of the first portable terminal and the account of the user of the first portable terminal;
a registration section that issues the account of the second portable terminal in response to the registration request from the first portable terminal confirmed to be a portable terminal of the member, and associates the account of the second portable terminal, with the terminal identifier of the second portable terminal received with the registration request and registers the account of the second portable terminal and the terminal identifier of the second portable terminal; and a communication section that notifies the account of the second portable terminal associated with the terminal identifier of the second portable terminal to the first portable terminal which is the sender of the registration request.

10. A community service system comprising:
a community service server that provides community service;
an authentication server that determines whether or not a member has authority to receive services provided by the community service server;
a plurality of portable terminals that include a first portable terminal and a second portable terminal; and
a network that connects between the community service server, the authentication server, and the plurality of portable terminals,
the first portable terminal comprising:
a terminal-to-terminal communication section that communicates directly with the second portable terminal;
an invitation processing section that sends the second portable terminal a request to send a terminal identifier of the second portable terminal and a mail address of the second portable terminal through the terminal-to-terminal communication section, the invitation processing section obtaining the terminal identifier of the second portable terminal and mail address of the second portable terminal through the terminal-to-terminal communication section;
a network communication section that sends the terminal identifier of the second portable terminal and the mail address of the second portable terminal and one of a terminal identifier of the first portable terminal and an account of a user of the first portable terminal, together with a registration request to the authentication server via the network,
the second portable terminal comprising:
a terminal-to-terminal communication section that communicates directly with the first portable terminal;
an invitation processing section that instructs a display section to display a message to inquire whether or not to send the terminal identifier and the mail address of the second portable terminal in a case of receiving the request to send the terminal identifier and the mail address of the second portable terminal; and
an operation section that receives an operation to permit sending of the terminal identifier and the mail address of the second portable terminal,
the invitation processing section of the second portable terminal sending to the first portable terminal the terminal identifier and the mail address of the second portable terminal through the terminal-to-terminal communication section of the second portable terminal only in a case where the operation section receives the operation to permit sending of the terminal identifier and the mail address of the second portable terminal,
the authentication server comprising:
an authentication section that confirms whether the user of the first portable terminal which is a sender of the registration request is the member or not, based on the one of the terminal identifier of the first portable terminal and the account of the user of the first portable terminal;
a registration section that issues an account of the second portable terminal in response to the registration request from the first portable terminal confirmed to be a portable terminal of the member, and associates the account of the second portable terminal, with the terminal identifier of the second portable terminal received with the registration request and registers the account of the second portable terminal and the terminal identifier of the second portable terminal; and a communication section that sends electronic mail including the account of the second portable terminal associated with the terminal identifier of the second portable terminal to the mail address of the second portable terminal.

* * * * *